US012241277B2

(12) United States Patent
Li et al.

(10) Patent No.: US 12,241,277 B2
(45) Date of Patent: Mar. 4, 2025

(54) LOCK SHIELDING STRUCTURE HAVING FINGERPRINT MODULE AND SMART LOCK

(71) Applicant: GUANGDONG YONGDING TECHNOLOGY CO., LTD., Guangdong (CN)

(72) Inventors: Zheng Li, Guangdong (CN); Jingke Wang, Guangdong (CN)

(73) Assignee: GUANGDONG YONGDING TECHNOLOGY CO., LTD., Guangdong (CN)

( * ) Notice: Subject to any disclaimer, the term of this patent is extended or adjusted under 35 U.S.C. 154(b) by 98 days.

(21) Appl. No.: 18/195,344

(22) Filed: May 9, 2023

(65) Prior Publication Data

US 2023/0279695 A1 Sep. 7, 2023

Related U.S. Application Data

(63) Continuation-in-part of application No. PCT/CN2022/116314, filed on Aug. 31, 2022.

(30) Foreign Application Priority Data

Sep. 3, 2021 (CN) ......................... 202122118640.0
Sep. 3, 2021 (CN) ......................... 202122129364.8

(51) Int. Cl.
*E05B 17/14* (2006.01)
*E05B 17/18* (2006.01)

(52) U.S. Cl.
CPC ............ *E05B 17/147* (2013.01); *E05B 17/18* (2013.01)

(58) Field of Classification Search
CPC ......... E05B 17/00; E05B 17/147; E05B 17/18
(Continued)

(56) References Cited

U.S. PATENT DOCUMENTS 6,374,652 B1 * 4/2002 Hwang .............. G07C 9/00563 292/350
7,040,125 B2 * 5/2006 Ciezki ................ G07C 9/00944 292/DIG. 31

(Continued)

FOREIGN PATENT DOCUMENTS

CA 2323600 * 7/2008
CA 2323600 C * 7/2008

(Continued)

OTHER PUBLICATIONS

International Search Report dated Nov. 28, 2022 for International Application No. PCT/CN2022/116314 which is the family application of the instant application.

*Primary Examiner* — Nathan Cumar
(74) *Attorney, Agent, or Firm* — ScienBiziP, P.C.

(57) ABSTRACT

The present disclosure provides a lock shielding structure having fingerprint module and a smart lock, the lock shielding structure having fingerprint module includes a cover for shielding a lock body, the cover comprises a rear plate and a front cover, a through hole is provided on the front cover, a fingerprint module is arranged in the through hole, a rear end face of the rear plate is equipped with an insertion shaft, a wire hole running through a front and a rear of the rear plate is defined on a position of the rear plate corresponding to the insertion shaft, and a wire in the lock body extends through the wire hole and connects to the fingerprint module. This not only saves volume, but also reduces holes in other parts, and makes the appearance more beautiful.

7 Claims, 4 Drawing Sheets

(58) Field of Classification Search
USPC .......................................................... 70/275
See application file for complete search history.

(56) References Cited

U.S. PATENT DOCUMENTS

| | | | | | |
|---|---|---|---|---|---|
| 7,377,144 | B1 * | 5/2008 | Huang | G07C 9/33 70/423 |
| 8,689,594 | B2 * | 4/2014 | Yanar | G07C 9/00944 70/279.1 |
| 8,947,530 | B1 * | 2/2015 | Scalisi | H04N 7/186 348/143 |
| 2004/0025550 | A1 * | 2/2004 | Yamagishi | G07C 9/00563 70/278.1 |
| 2012/0255332 | A1 * | 10/2012 | Dubbey | E05C 19/003 70/461 |
| 2014/0265359 | A1 * | 9/2014 | Cheng | E05B 47/0012 292/144 |

FOREIGN PATENT DOCUMENTS

| | | | | |
|---|---|---|---|---|
| CN | 206000275 | U | | 3/2017 |
| CN | 210342944 | U | | 4/2020 |
| CN | 111236774 | A | * | 6/2020 |
| CN | 210714118 | U | | 6/2020 |
| CN | 210828701 | U | | 6/2020 |
| CN | 213755239 | U | * | 7/2021 |
| CN | 215803808 | U | | 2/2022 |
| CN | 215803809 | U | | 2/2022 |
| JP | 2005200939 | A | | 7/2005 |
| JP | 2007285088 | A | | 11/2007 |

* cited by examiner

LOCK SHIELDING STRUCTURE HAVING FINGERPRINT MODULE AND SMART LOCK

TECHNICAL FIELD

The disclosure relates to a lock shielding structure having fingerprint module and a smart lock.

BACKGROUND

With the advancement of technology and society, most of the existing traditional door locks have been replaced by the smart lock. However, the smart lock still retains a keyhole and a charging hole positioned on its front lock, and therefore a shielding cover is used to shield these two holes in the smart locks.

A fingerprint identification module is generally arranged on the handle of the smart lock for easy operation. However, the above arrangement method of the fingerprint identification module is unreasonable for some smart locks without the handle.

What is needed, therefore, is a lock shielding structure of the smart lock that can overcome the above-described deficiencies.

SUMMARY OF INVENTION

The purpose of the present disclosure is to provide a lock shielding structure having fingerprint module and a smart lock.

According to one aspect of the present disclosure, there is provided an exemplary embodiment of a lock shielding structure having fingerprint module. A lock shielding structure having fingerprint module, including a cover configured for shielding a lock body, the cover comprises a rear plate and a front cover, a through hole is defined on the front cover, a fingerprint module is positioned in the through hole, a rear end face of the rear panel is equipped with an insertion shaft, a wire hole running through a front and a rear of the rear plate is provided on a position of the rear plate corresponding to the insertion shaft, and a wire in the lock body extends through the wire hole and connects to the fingerprint module.

In the present disclosure, a fingerprint module bracket is positioned between the rear plate and the front cover, and the fingerprint module is positioned on the fingerprint module bracket.

In the present disclosure, the insertion shaft is configured to insert into an insertion hole of the lock body, a wall surface of the insertion shaft is provided with a limiting portion, and the limiting portion is configured to be inserted into an arc-shaped positioning groove of the lock body.

In the present disclosure, an elastic resetting assembly is positioned between the insertion shaft and the lock body.

In the present disclosure, the elastic resetting assembly comprises a snap ring movably snap-fitted onto the insertion shaft, and a spring provided between the snap ring and the front lock body.

In the present disclosure, an annular groove is provided on the insertion shaft, and the snap ring is snapped into the annular groove.

In the present disclosure, a magnetic attraction assembly is mounted on the cover and the lock body.

In the present disclosure, the magnetic attraction assembly comprises a plurality of grooves provided on a rear end face of the cover, each of the plurality of grooves is equipped with a first magnet, and a second magnet is correspondingly provided on the lock body which is located at a rear side of the first magnet.

In the present disclosure, the cover is further configured for shielding a charging port and a keyhole of the lock body.

According to one aspect of the present disclosure, there is provided another exemplary embodiment of a smart lock. The smart lock includes a lock shielding structure having fingerprint module, the lock shielding structure having fingerprint module including: a fingerprint module; a fingerprint bracket; a cover configured for shielding a lock body, the cover comprises a rear plate and a front cover, a through hole is provided on the front cover, the fingerprint module is positioned in the through hole, and the fingerprint module bracket is positioned between the rear plate and the front cover, and the fingerprint module is positioned on the fingerprint module bracket, a insertion shaft is mounted on the cover and the insertion shaft is configured to be inserted into a insertion hole of a lock body, a limiting portion configured to be mounted on the lock body, when the cover and the insertion shaft rotate together with the insertion shaft as a rotation axis, the limiting portion is configured to limit a rotation range of the insertion shaft, the cover is configured for shielding a keyhole of the lock body; and an elastic resetting assembly positioned between the insertion shaft and the lock body, the elastic resetting assembly including a connecting portion coupled with the insertion shaft and a spring provided between the connecting portion and the lock body.

The present disclosure has the advantages of simple and reasonable structure, convenient operation, and small volume, compared with the prior art, it includes a cover, the cover comprises a rear plate and a front cover, a through hole is provided on the front cover, and a fingerprint module bracket is mounted on the rear plate, the fingerprint module bracket is equipped with a fingerprint module, the fingerprint module is arranged in the through hole, and a rear end face of the rear plate is provided with an insertion shaft, a wire hole running through the front and rear is provided on a position of the rear plate corresponding to the insertion shaft, that is, a circuit in the lock body passes through the wire hole and is connected to the fingerprint module. By providing the fingerprint module on the cover, not only the volume is saved, but also holes are reduced in other parts, making the appearance more beautiful.

DETAILED DESCRIPTION

The present disclosure is further described below with reference to the accompanying drawings and embodiments.

Figure 1:
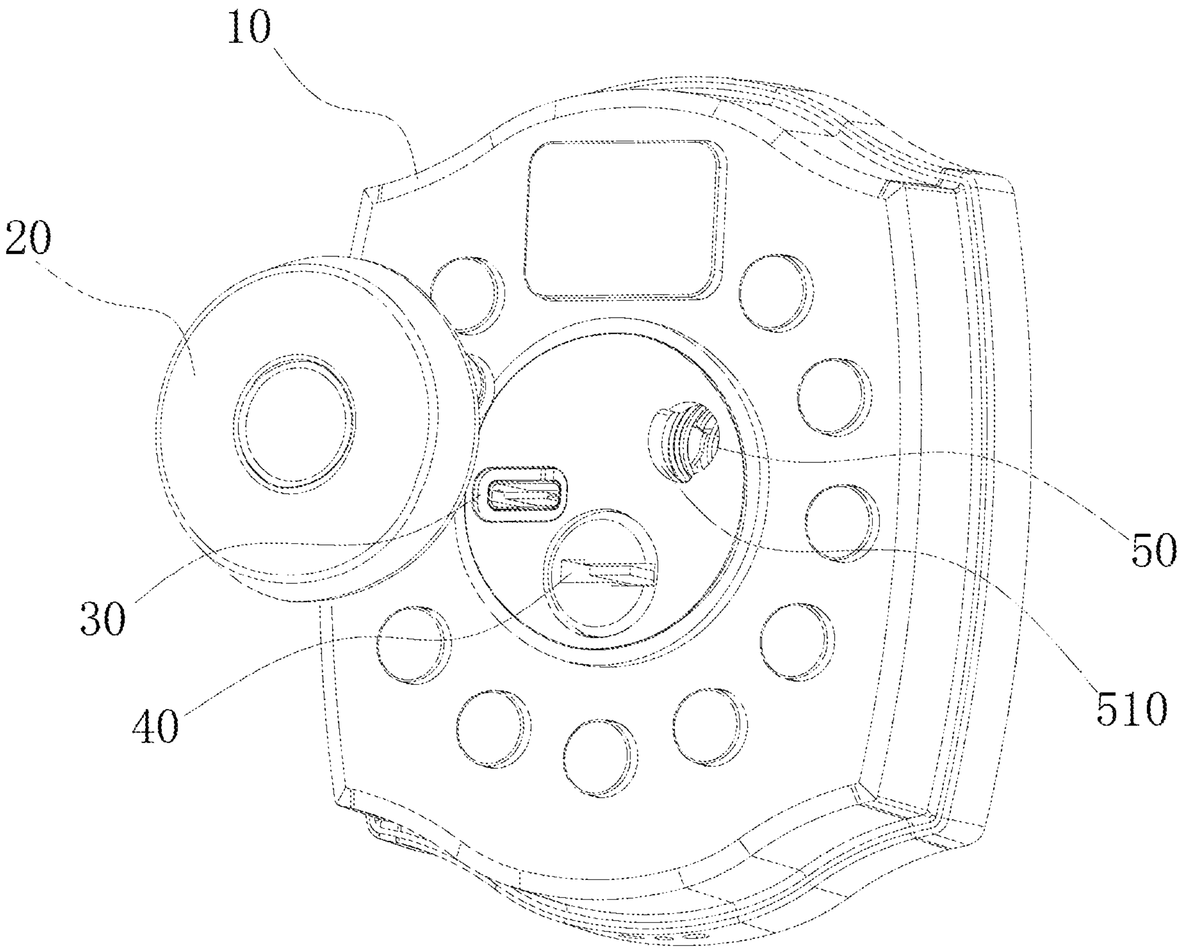
FIG. 1 is a perspective view of the present disclosure.
Figure 2:
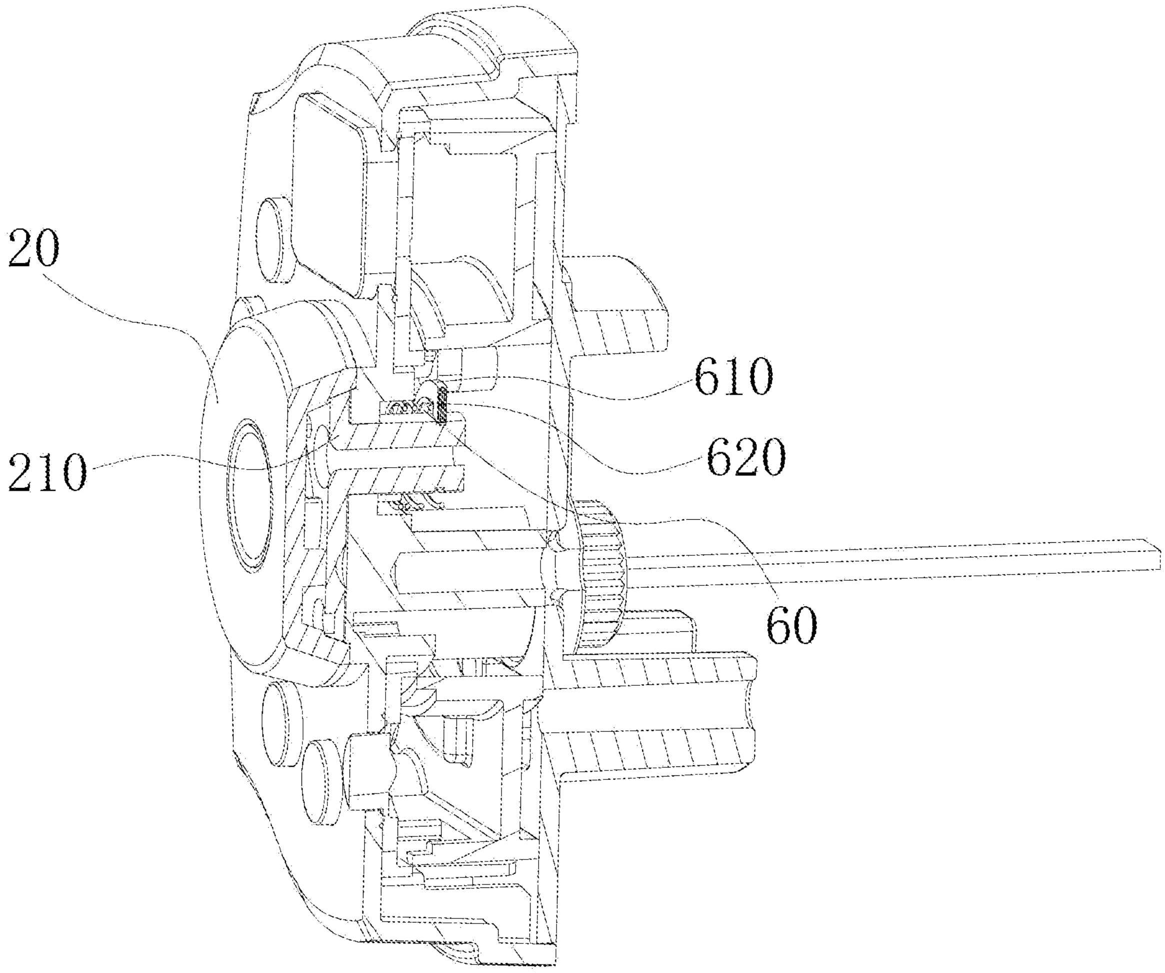
FIG. 2 is a sectional view of the present disclosure.
Figure 3:
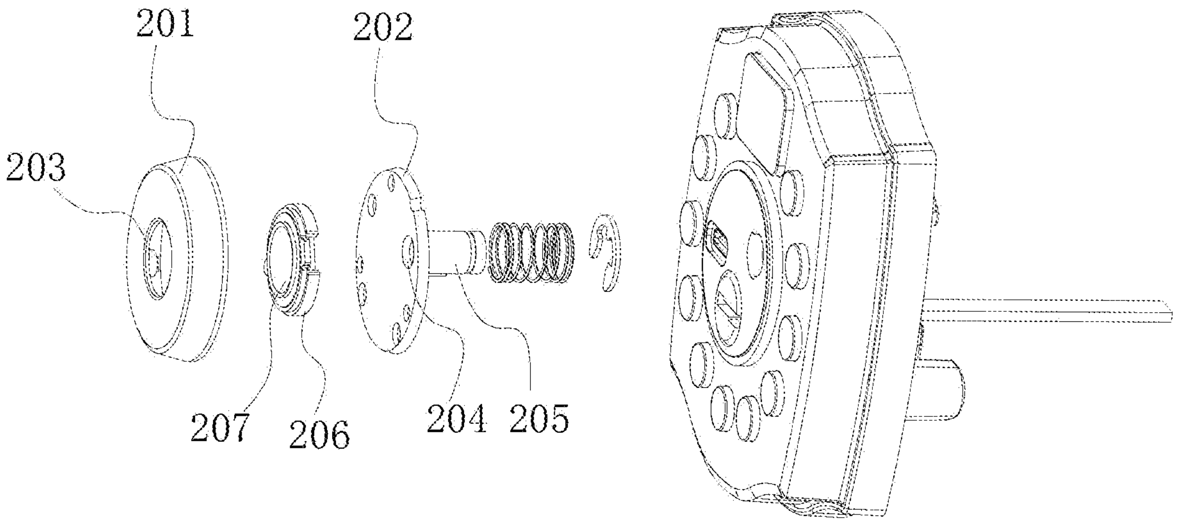
FIG. 3 is a first exploded view of the present disclosure.
Figure 4:
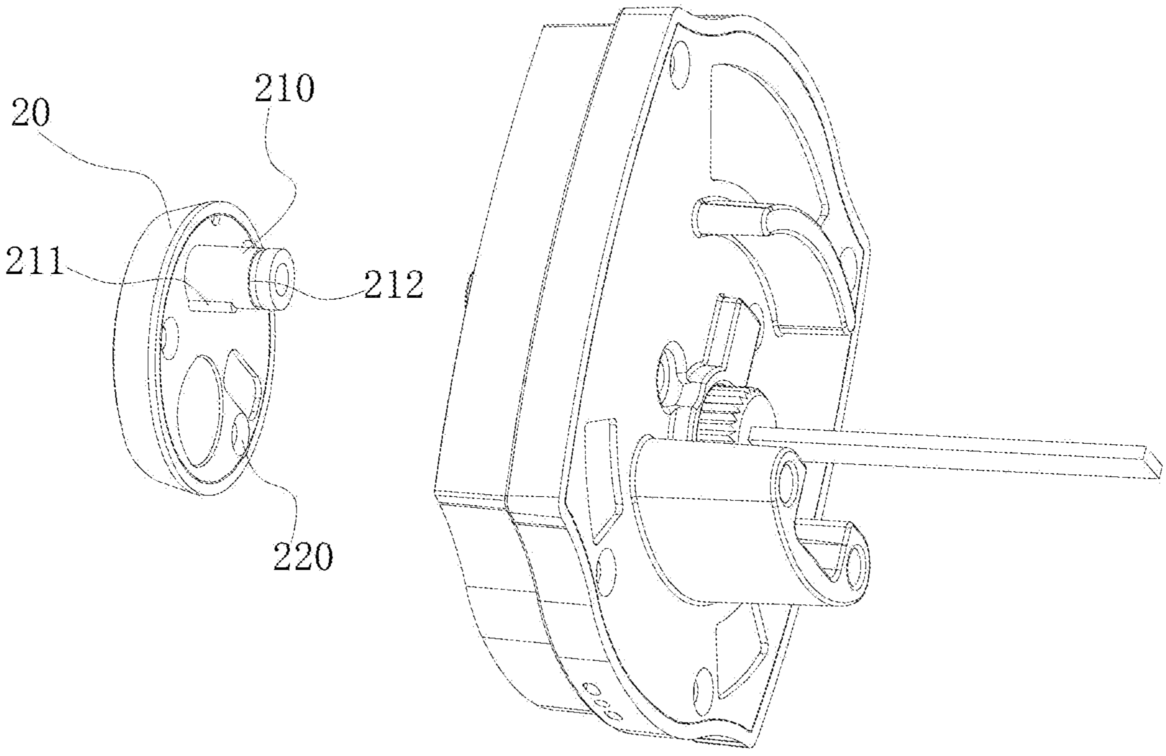
FIG. 4 is a second exploded view of the present disclosure.

Referring to FIG. 1 to FIG. 4, a lock shielding structure having fingerprint module 100 comprises a cover 20 for shielding a lock body 10. The cover 20 comprises a rear plate 202 and a front cover 201, a through hole 203 is provided on the front cover 201, and a fingerprint module bracket 206 is mounted on the rear plate 202, a fingerprint module 207 is arranged on the fingerprint module bracket 206, the fingerprint module 207 is arranged in the through hole 203, and a rear end face of the rear plate 202 is equipped with an insertion shaft 210, a wire hole 204 running through a front and a rear of the rear plate 202 is provided on a position of the rear plate 202 corresponding to the insertion shaft 210, that is, a circuit in the lock body 10 extends through the wire hole 204 and connects to the fingerprint module 207, by providing the fingerprint module 207 on the cover 20, not only the volume of the lock shielding structure having fingerprint module 100 is saved, but also holes are reduced in other parts, and making the appearance more beautiful.

Specifically, a front side of the lock body 10 is provided with the cover 20 for shielding a charging port 30 and a keyhole 40, an insertion hole 50 is provided on the lock body 10, an arc-shaped positioning groove 510 is provided on an inner wall of the insertion hole 50, the insertion shaft 210 is configured to insert into the insertion hole 50, and a wall surface of the insertion shaft 210 is provided with a limiting portion 211, the limiting portion 211 is configured to insert into the arc-shaped positioning groove 510, and an elastic resetting component 60 is arranged between the insertion shaft 210 and the lock body 10.

That is, the cover 20 and the insertion shaft 210 rotate together with the insertion shaft 210 as a rotation axis, and when the cover 20 and the insertion shaft 210 rotate together with the insertion shaft 210 as the rotation axis, the limiting portion 211 moves in the arc-shaped positioning groove 510, and the arc-shaped positioning groove 510 can limit a rotation range of the insertion shaft 210, that is, limit an opening range of the cover 20, so that automatic reset is conveniently implemented by matching the elastic resetting component 60 described later.

By means of a cooperation between the limiting portion 211 and the arc-shaped positioning groove 510, a rotation angle of the cover 200 can be limited, so as to prevent a winding of a line of the fingerprint module 207.

Specifically, the elastic resetting component 60 comprises a snap ring 610 movably snap-fitted onto the insertion shaft 210, and a spring 620 is positioned between the snap ring 610 and the front side of the lock body 10, one end of the spring 620 is fixedly connected to the lock body 10, and the other end of the spring 620 is fixedly connected to the snap ring 610. Resetting through the spring 620, and the structure is simply, and the resetting is convenient.

In one embodiment, a magnetic attraction assembly is mounted on the cover 20 and the lock body 10, which can accurately position and prevent misalignment when the cover 20 is reset through magnetic adsorption.

Specifically, the magnetic attraction assembly comprises a plurality of grooves 220 provided on a rear end face of the cover 20, each of the plurality of grooves 220 is equipped with a first magnet, a second magnet is correspondingly fixed on the lock body 10 which is located at a rear side of the first magnet, and adsorption is performed by means of the first magnet and the second magnet, so that quick positioning is achieved, and use requirements are met.

Specifically, an annular groove 212 is provided on the insertion shaft 210, and the snap ring 610 is snapped onto the annular groove 212.

The present disclosure also provides a smart lock, the smart lock comprises a lock shielding structure having fingerprint module 100 as described above.

In the description of the present disclosure, it should be understood that the orientation or position relations indicated by the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise" and the like are based on the orientation or position relations shown in the drawings, it is only for convenience in describing the present disclosure and simplifying the description, rather than indicating or implying that the indicated device or element must have a particular orientation, be constructed and operated in a particular orientation, therefore, the terms "first" and "second" are used herein for purposes of description and are not intended to indicate or imply relative importance or significance or to imply the number of indicated technical features.

The basic principles and main features of the invention and the advantages of the invention are shown and described above. Those skilled in the art will appreciate, the present disclosure is not limited to the above embodiments, the above embodiments and descriptions are merely illustrative of the principle of the present disclosure, various changes and modifications may be made without departing from the spirit and scope of the invention, and all such changes and modifications belong to the scope of the invention as claimed. The scope of the invention is defined by the appended claims and their equivalents.

What is claimed is:

1. A lock shielding structure having fingerprint module, comprising:

a cover configured for shielding a lock body, wherein the cover comprises a rear plate and a front cover, a through hole is defined on the front cover, a fingerprint module is positioned in the through hole, a rear end face of the rear panel is equipped with an insertion shaft, a wire hole running through a front and a rear of the rear plate is provided on a position of the rear plate corresponding to the insertion shaft, a wire in the lock body extends through the wire hole and connects to the fingerprint module;

the insertion shaft is configured to insert into an insertion hole of the lock body, a wall surface of the insertion shaft is provided with a limiting portion, and the limiting portion is configured to be inserted into an arc-shaped positioning groove of the lock body, an elastic resetting assembly is positioned between the insertion shaft and the lock body; the elastic resetting assembly comprises a snap ring movably snap-fitted onto the insertion shaft, and a spring provided between the snap ring and the lock body.

2. The lock shielding structure having fingerprint module according to claim 1, wherein a fingerprint module bracket is positioned between the rear plate and the front cover, and the fingerprint module is positioned on the fingerprint module bracket.

3. The lock shielding structure having fingerprint module according to claim 1, wherein an annular groove is provided on the insertion shaft, and the snap ring is snapped into the annular groove.

4. The lock shielding structure having fingerprint module according to claim 1, wherein a magnetic attraction assembly is mounted on the cover and the lock body.

5. The lock shielding structure having fingerprint module according to claim 4, wherein the magnetic attraction assembly comprises a plurality of grooves provided on a rear end face of the cover, each of the plurality of grooves is equipped with a first magnet, and a second magnet is correspondingly provided on the lock body which is located at a rear side of the first magnet.

6. The lock shielding structure having fingerprint module according to claim 1, wherein the cover is further configured for shielding a charging port and a keyhole of the lock body.

7. A smart lock comprising a lock shielding structure having fingerprint module, the lock shielding structure having fingerprint module comprising:

a fingerprint module;

a fingerprint bracket;

a cover configured for shielding a lock body, wherein the cover comprises a rear plate and a front cover, a through hole is provided on the front cover, the fingerprint module is positioned in the through hole, and the fingerprint module bracket is positioned between the rear plate and the front cover, and the fingerprint module is positioned on the fingerprint module bracket, an insertion shaft is mounted on the cover and the insertion shaft is configured to be inserted into a insertion hole of a lock body;

a limiting portion configured to be mounted on the lock body, wherein when the cover and the insertion shaft rotate together with the insertion shaft as a rotation axis, the limiting portion is configured to limit a rotation range of the insertion shaft, the cover is configured for shielding a keyhole of the lock body; and an elastic resetting assembly positioned between the insertion shaft and the lock body, the elastic resetting assembly comprising a snap ring movably snap-fitted onto the insertion shaft and a spring provided between the snap ring and the lock body.

* * * * *